United States Patent
Ziche et al.

(10) Patent No.: US 7,319,128 B2
(45) Date of Patent: Jan. 15, 2008

(54) PREPARATION OF ORGANYLOXYSILYL-TERMINATED POLYMERS

(75) Inventors: Wolfgang Ziche, Diera-Zehren (DE); Wolfram Schindler, Tüßling (DE)

(73) Assignee: Wacker Chemie AG, Munich (DE)

(*) Notice: Subject to any disclaimer, the term of this patent is extended or adjusted under 35 U.S.C. 154(b) by 233 days.

(21) Appl. No.: 10/970,561

(22) Filed: Oct. 21, 2004

(65) Prior Publication Data

US 2005/0119436 A1   Jun. 2, 2005

(30) Foreign Application Priority Data

Nov. 27, 2003   (DE) ............................. 103 55 318

(51) Int. Cl.
  *C08G 77/08* (2006.01)
  *C08G 77/18* (2006.01)
(52) U.S. Cl. .................. 528/29; 525/403; 528/901
(58) Field of Classification Search ............. 525/403; 528/901, 29
See application file for complete search history.

(56) References Cited

U.S. PATENT DOCUMENTS

| | | | | |
|---|---|---|---|---|
| 5,258,578 A | * | 11/1993 | Smith et al. | ................ 174/93 |
| 5,976,669 A | * | 11/1999 | Fleming | ................ 428/143 |
| 6,319,311 B1 | * | 11/2001 | Katz et al. | ............ 106/287.11 |
| 6,569,980 B1 | * | 5/2003 | Masaoka et al. | ............. 528/27 |
| 6,624,260 B2 | * | 9/2003 | Ando et al. | ................ 525/476 |

FOREIGN PATENT DOCUMENTS

| | | |
|---|---|---|
| EP | 0 372 561 | 6/1990 |
| EP | 0 397 036 | 11/1990 |
| EP | 0 538 880 | 4/1993 |
| EP | 0 673 972 | 9/1995 |
| EP | 0 931 800 | 7/1999 |
| WO | WO 98/28642 | 7/1998 |

* cited by examiner

Primary Examiner—Kuo-Liang Peng
(74) Attorney, Agent, or Firm—Brooks Kushman P.C.

(57) ABSTRACT

The present invention relates to a process for preparing organyloxysilyl-terminated polymers which have increased stability toward atmospheric moisture, by reacting hydroxy-terminated organic polymers with isocyanato-functional silanes in the presence of at least one catalyst selected from the group consisting of bismuth and zinc compounds, and to crosslinkable compositions comprising such polymers.

17 Claims, No Drawings

PREPARATION OF ORGANYLOXYSILYL-TERMINATED POLYMERS

BACKGROUND OF THE INVENTION

1. Field of the Invention

The invention relates to a process for preparing organyloxysilyl-terminated polymers which have increased stability toward atmospheric moisture, and to crosslinkable compositions comprising such polymers.

2. Background Art

Moisture-crosslinkable formulations are well known, particularly those which are based on silyl-functionalized polymers. In turn, preference among such polymers is given to those having terminal alkoxysilyl groups, since the cleavage products are noncorrosive and do not raise toxicological concerns. The silyl-functionalized polymers are prepared by conventional methods. One example is the reaction of polymers which have end groups having active hydrogen with isocyanates, particularly isocyanatoalkylalkoxysilanes. The reaction may be carried out with or without catalysts which promote isocyanate reaction. EP 931 800 A describes the preparation of silane-functional polyurethanes from hydroxy-functional prepolymers and, for example, isocyanatopropyltrimethoxysilane under anhydrous conditions, and preferably under an inert gas atmosphere in order to prevent premature hydrolysis of the alkoxysilane groups. EP 372 561 A describes the preparation of a silane-crosslinkable polyether which has to be stored with exclusion of moisture, since it vulcanizes with or without silane condensation catalysts. The fact that this preventative measure is independent of the preparation process of the silane-crosslinkable polyether can be taken from EP 397 036 A1. In the latter publication, a polyether, for example one with allyl end groups is reacted with an alkoxyhydridosilane. The publication indicates that premature vulcanization proceeds even without a silane condensation catalyst.

Known silane condensation catalysts include numerous compounds, for example dialkyltin(IV) compounds such as dibutyltin dilaurate; various metal complexes (chelates and carboxylates), for example of titanium, bismuth, zirconium, amines and salts thereof; and other known acidic and basic catalysts as well. Reference may be had, for example to EP-A 673 972 and EP-A 538 880. However, known catalysts which promote the isocyanate reaction with hydroxyl groups are often those which also promote silane condensation, for example dialkyltin(IV) compounds and metal complexes (chelates and carboxylates) of bismuth and zinc, or tertiary amine compounds.

The disadvantage of all known processes for preparing silane-crosslinkable polymers is due to the fact that the polymers have to be handled under conditions including exclusion of moisture. However, in industrial practice this is associated with a high degree of complexity and is therefore expensive.

SUMMARY OF THE INVENTION

It has now been surprisingly discovered that isocyanatoalkylalkoxysilanes may be reacted efficiently with hydroxyl-functional compounds to produce alkylalkoxysilyl-terminated products through use of bismuth and zinc complexes as urethane reaction-promoting catalysts, yet the alkoxysilane-functional products exhibit excellent stability in the presence of moisture. The storage stable products serve as useful ingredients for moisture-curable one-component elastomers.

DETAILED DESCRIPTION OF THE PREFERRED EMBODIMENTS

The invention provides a process for preparing organyloxysilyl-terminated polymers, preferably of the formula

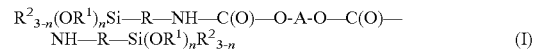

(I)

by reacting α,ω-dihydroxy-terminated organic polymers of the formula

(II)

with isocyanato-functional silanes of the formula

(III)

in the presence of at least one catalyst selected from the group consisting of bismuth and zinc compounds, where R are each divalent, optionally substituted hydrocarbon radicals having from 1 to 12 carbon atoms which may be interrupted by heteroatoms, $R^1$ may be the same or different and may each be a monovalent, optionally substituted hydrocarbon radical having from 1 to 12 carbon atoms which may be interrupted by heteroatoms, $R^2$ may be the same or different and may each be a monovalent, optionally substituted hydrocarbon radical having from 1 to 12 carbon atoms which may be interrupted by heteroatoms, A is a divalent, optionally substituted hydrocarbon radical having at least 6 carbon atoms which may be interrupted by heteroatoms, and n is 1, 2 or 3.

Examples of divalent R radicals are alkylene radicals such as the methylene, ethylene, n-propylene, isopropylene, n-butylene, isobutylene, tert-butylene, n-pentylene, isopentylene, neopentylene, and tert-pentylene radicals, hexylene radicals such as the n-hexylene radical, heptylene radicals such as the n-heptylene radical, octylene radicals such as the n-octylene radical and isooctylene radicals such as the 2,2,4-trimethylpentylene radical, nonylene radicals such as the n-nonylene radical, decylene radicals such as the n-decylene radical, dodecylene radicals such as the n-dodecylene radical; alkenylene radicals such as the vinylene and the allylene radical; cycloalkylene radicals such as cyclopentylene, cyclohexylene, cycloheptylene radicals and methylcyclohexylene radicals; arylene radicals such as the phenylene and the naphthylene radical; alkarylene radicals such as o-, m-, and p-tolylene radicals, xylylene radicals and ethylphenylene radicals; and aralkylene radicals such as the benzylene radical, and the α- and the β-phenylethylene radicals.

The R radical is preferably a divalent hydrocarbon radical having from 1 to 6 carbon atoms, more preferably a divalent hydrocarbon radical having from 1 to 3 carbon atoms, especially the methylene radical.

Examples of $R^1$ and $R^2$ radicals are in each case independently, alkylradicals such as the methyl, ethyl, n-propyl, isopropyl, n-butyl, isobutyl, tert-butyl, n-pentyl, isopentyl, neopentyl, and tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical; alkenyl radicals such as the vinyl and the allyl radicals; cycloalkyl radicals such as cyclopentyl, cyclohexyl, cycloheptyl and methylcyclohexyl radicals; aryl radicals such as the phenyl and the naphthyl radicals; alkaryl radicals such as the o-, m-, and p-tolyl radicals, xylyl radicals, and ethylphenyl radicals; and aralkyl radicals such as the benzyl radical, and the α- and the β-phenylethyl radicals. Examples of substituted $R^1$ radicals are alkoxyalkyl radicals, for example ethoxy and methoxyethyl radicals.

The $R^1$ and $R^2$ radicals are preferably each independently a hydrocarbon radical having from 1 to 6 carbon atoms, more preferably an alkyl radical having from 1 to 4 carbon atoms, especially the methyl radical.

Examples of the A radical are multivalent, preferably divalent polymer radicals such as polyether radicals of the general formula —$(R^3O)_m$—, where $R^3$ may be the same or different and be optionally substituted hydrocarbon radicals, preferably methylene, ethylene and 1,2-propylene radicals, and m is an integer from 7 to 600, preferably from 70 to 400 (as commercially available, for example, under the name "Acclaim 12200" from Bayer AG, Germany, "Alcupol 12041LM" from Repsol, Spain and "Poly L 220-10" from Arch Chemicals USA), polyester radicals, polycarbonate radicals, polyester carbonate radicals (for example those commercially available under the name "Desmophen 1700" and "Desmophen C-200" from Bayer AG, Germany), polybutenylene radicals and polybutadienylene radicals (for example those commercially available under the name "Poly bd® R-45 HTLO" from Sartomer Co., Inc., USA or "Kraton™ Liquid L-2203" from Kraton Polymers USA LLC), polyurethane radicals, and polyurea radicals.

The organic polymers of the formula (II) are preferably polymer formulations which are based on polyethers and polyurethanes; particular preference is given to those which are based on polyethers, and of these in turn, especially to 1,2-polypropylene glycols having molecular weights preferably greater than 4000, more preferably from 4000 to 20 000 (nominal molecular weight). In the polymers of the subjection invention, n preferably has the value 2 or 3. The organic polymers of the formula (II) preferably have a viscosity at 23° C. of from 10 to 1,000,000 mPas, more preferably from 1000 to 300,000 mPas. The polymers of the formula (II) may be commercial products or may be prepared by processes known in polymer chemistry.

Examples of silanes of the formula (III) are isocyanatomethyldimethylmethoxysilane, isocyanatopropyldimethylmethoxysilane, isocyanatomethylmethyldimethoxysilane, isocyanatopropylmethyldimethoxysilane, isocyanatomethyltrimethoxysilane and isocyanatopropyltrimethoxysilane, preference being given to isocyanatomethylmethyldimethoxysilane, isocyanatopropylmethyldimethoxysilane, isocyanatomethyltrimethoxysilane and isocyanatopropyltrimethoxysilane, and particular preference to isocyanatomethylmethyldimethoxysilane and isocyanatopropylmethyldimethoxysilane. The silanes of the formula (III) used in accordance with the invention are commercial products or may be prepared by processes common in silicon chemistry.

In the process according to the invention, silanes of the formula (III) are used in amounts such that the molar ratio of Si—R—NCO radicals to hydroxyl radicals in polymers of the formula (II) is preferably from 0.75 to 1.25, more preferably from 0.9 to 1.1.

Examples of the catalysts used in accordance with the invention are zinc acetylacetonate, bismuth(2-ethylhexanoate), bismuth neodecanoate, zinc 2-ethylhexanoate, zinc neodecanoate and bismuth tetramethylheptanedioate. Examples of commercially available catalysts are Borchi® Kat 22, Borchi® Kat VP 0243, Borchi® Kat VP 0244 (Borchers GmbH), the BICAT® types (The Shepherd Chemical Company, USA) and K-Kat® K-348 (KING INDUSTRIES, INC., USA). The catalyst is preferably a carboxylate of bismuth or zinc, particular preference being given to bismuth 2-ethylhexanoate, bismuth neodecanoate, zinc 2-ethylhexanoate and zinc neodecanoate, or mixtures thereof.

In the inventive process, catalysts are preferably used in amounts of from 0.001 to 1.0 part by weight, more preferably from 0.01 to 0.5 part by weight, based in each case on 100 parts by weight of the isocyanatosilane of the formula (III).

The process of the invention is preferably carried out at temperatures of from 0 to 150° C., more preferably from 30 to 100° C., and at a pressure of the surrounding atmosphere, i.e. from about 900 to 1100 hPa, and may be carried out either continuously or batchwise.

The inventive process has the advantage that it is rapid and simple to carry out, and readily available raw materials are used as reactants. Surprisingly, it has been found that the organyloxy-terminated polymers prepared by the process are stable toward atmospheric moisture and do not need any catalyst deactivation, which considerably eases handling in the course of the further processing. A further advantage of the process is that the polymers may be further processed directly, for example in the preparation of crosslinkable compositions.

The organyloxysilyl-terminated polymers prepared in accordance with the invention may be used anywhere where organyloxysilyl-terminted polymers have also been used to date, and are especially suitable for use in crosslinkable compositions.

The present invention further provides a process for preparing crosslinkable compositions, which comprises, in a first step, converting polyhydroxyl-functional compounds, preferably α,ω-dihydroxy-terminated organic polymers of the formula

OH-A-OH       (II)

by reaction with isocyanato-functional silanes of the formula

$R^2_{3-n}(OR^1)_n$Si—R—NCO       (III)

in the presence of catalysts selected from the group consisting of bismuth and zinc compounds, to organyloxysilyl-terminated polymers where R, $R^1$, $R^2$, A and n are each as defined above, and in a second step, mixing the polymers (A) obtained in the first step with silane condensation catalyst (B) and optionally, further substances (C).

Examples of silane condensation catalysts (B) which bring about vulcanization of the organyloxysilyl-terminated polymers under the influence of atmospheric moisture are dibutyltin dilaurate, dibutyltin diacetate, tetrabutyldimethoxydistannoxane, solutions of dibutyltin oxide in methyltrimethoxysilane or tetraethoxysilane, dioctyltin dilaurate, dioctyltin diacetate, tetraoctyldimethoxydistannoxane, solutions of dioctyltin oxide in methyltrimethoxysilane or tetraethoxysilane, dibutyltin bis(2,4-pentanedionate), dibutyltin maleate, aminopropyltrimethoxysilane and aminoethylaminopropyltrimethoxysilane, and also acidic catalysts such as organic carboxylic acids, e.g. propionic acid and acetic acid, phosphoric acids or phosphoric esters, acid chlorides or hydrochlorides.

The silane catalysts (B) are preferably dialkyltin diacylates, amines and phosphoric esters, more preferably mono- and dialkyl phosphates and aminoalkyl silanes.

In the second step of the process of the invention for preparing crosslinkable compositions, silane catalyst (B) is preferably used in amounts of from 0.01 to 3.0 parts by weight, more preferably from 0.1 to 1.0 part by weight, based in each case on 100 parts by weight of polymer (A).

The further substances (C) optionally used may be any components which are useful in crosslinkable compositions, preferably, fillers, additives, for example adhesion promoters, UV stabilizers, antioxidants, pigments and siccatives, crosslinkers such as alkoxysilanes, plasticizers, for example phthalates, polyethers and polybutenes, more preferably adhesion promoters, fillers and plasticizers.

Examples of optional fillers are nonreinforcing fillers, i.e. fillers having a BET surface area of up to 50 m$^2$/g, such as quartz, diatomaceous earth, calcium silicate, zirconium silicate, zeolites, metal oxide powder such as aluminum oxides, titanium oxides, iron oxides or zinc oxides, or mixed oxides thereof, barium sulfate, calcium carbonate, gypsum, silicon nitride, silicon carbide, boron nitride, glass and plastic powder, such as polyacrylonitrile powder; reinforcing fillers, i.e. fillers having a BET surface area of more than 50 m$^2$/g such as pyrogenic silica, precipitated silica, carbon black such as furnace black and acetylene black, and silicon-aluminum mixed oxides of large BET surface area; fibrous fillers such as asbestos and carbon fibers.

The fillers mentioned above may be hydrophobicized, for example by treatment with organosilanes, with organosiloxanes, or with stearic acid, or by etherification of hydroxyl groups to alkoxy groups. In the case of the sole use of reinforcing silica as a filler, transparent RTC compositions may be prepared. The amounts of fillers is preferably from 1.0 to 50.0 parts by weight, more preferably from 5 to 30 parts by weight, based in each case on 100 parts by weight of polymer (A).

Examples of optional additives are adhesion promoters such as aminopropyltrimethoxysilane and aminoethylaminopropyltriethoxysilane, UV stabilizers and antioxidants, for example those commercially available under the name Tinuvin® 292, Tinuvin® 327 and Tinuvin® 770 from Ciba Spezialitätenchemie Lampertsheim GmbH, pigments such as iron oxide, and siccatives such as trimethyl carbonate, vinyltrimethoxysilane and O-methyl N-trimethoxysilylcarbamate. Additives are preferably used in amounts of from 1 to 200 parts by weight, more preferably from 10 to 100 parts by weight, based in each case on 100 parts by weight of polymer (A).

Examples of crosslinkers are compounds having at least three hydrolyzable groups, such as acetoxy, oximato, and organyloxy groups such as ethoxy radicals, alkoxyethoxy radicals and methoxy radicals, preference being given to compounds having organyloxy groups.

If crosslinkers are used, they are preferably alkoxysilanes such as vinyltrimethoxysilane, methyltrimethoxysilane, propyltrimethoxysilane, O-methyl N-trimethoxysilylcarbamate and O-methyl N-dimethoxy(methyl)silylcarbamate and/or partial hydrolyzates thereof, particular preference being given to vinyltrimethoxysilane and O-methyl N-trimethoxysilylcarbamate. Crosslinkers are preferably used in amounts of from 0.1 to 10 parts by weight, more preferably from 1 to 5 parts by weight, based in each case on 100 parts by weight of polymer (A).

Examples of plasticizers are phthalates, polyethers and polybutenes, preference being given to phthalates and polyethers. When incorporating plasticizers, the amounts are preferably from 1 to 200 parts by weight, more preferably from 10 to 100 parts by weight, based in each case on 100 parts by weight of polymer (A).

Each of the various components used in the second step of the inventive process may be one type of such a component, or else a mixture of two or more types of that particular component.

The individual components may be mixed together in any sequence by means of apparatuses which are familiar to those skilled in the art for this purpose, for example dissolvers, planetary dissolvers, planetary mixers and twin-screw kneaders. The second step of the process has to be carried out with the substantial exclusion of atmospheric moisture as soon as silane catalyst (B) is present, and is preferably carried out at temperatures of from 10 to 100° C., more preferably from 20 to 70° C., and at a pressure of the surrounding atmosphere, i.e. from about 900 to 1100 hPa. The second step of the process may be carried out either continuously or batchwise. Moreover, the individual steps may be carried out separately or by what is known as a one-pot reaction in one reaction vessel.

The inventive process has the advantage that the preparation of the moisture-crosslinkable polymer does not entail exclusion of atmospheric moisture in the first step. This also holds true for the further handling of the polymer up to the time at which a silane condensation catalyst is added in the second step. For the user, simplified storage even of opened containers is readily possible.

A particular advantage of the process is that it can be conducted as a one-pot reaction (or successive reaction in the case of continuous production), since there is no need whatsoever for any deactivation of any additives, or workup of the silyl-functional polymer prepared after any of the substeps.

The crosslinkable compositions prepared in accordance with the invention may be used for all purposes for which compositions crosslinkable at room temperature by condensation/hydrolysis reaction are useful. They therefore have outstanding suitability, for example, as sealing compositions for joints, including joints which run vertically, and similar cavities, for example of buildings, land vehicles, watercraft and aircraft, or as adhesives, caulks or putties, for example in window construction or in the production of display cabinets, and also for producing protective coatings or elastomeric moldings, and also for the insulation of electric or electronic equipment. The inventive RTC compositions are especially suitable as low-modulus sealing compositions for joints which require very high absorption of motion.

For the crosslinking of the compositions prepared in accordance with the invention, the typical water content of air is sufficient. The crosslinking may be carried out at room temperature or, if desired, also at higher or lower temperatures, for example at from −5 to 10° C. or at from 30 to 50° C. The crosslinking is preferably carried out at a pressure of the surrounding atmosphere, i.e. from about 900 to 1100 hPa.

In the examples described below, all specifications of parts with percentages, unless stated otherwise, are based on weight. Furthermore, all viscosity data relate to a temperature of 20° C. Unless stated otherwise, the examples which follow are carried out at a pressure of the surrounding atmosphere, i.e. at about 1000 hPa, and room temperature, i.e. about 20° C., or at a temperature which is established when the reactants are combined at room temperature without additional heating or cooling.

EXAMPLE 1

4 g of polypropylene glycol having an average molecular weight $M_n$ of 425 Da (commercially available from Sigma-Aldrich Chemie GmbH; 18.8 mmol of terminal OH groups) are mixed efficiently with a mixture of 3 mg of bismuth neodecanoate (commercially available from ABCR GmbH & Co. KG) and 2 mg of zinc 2-ethylhexanoate (commercially available from ABCR GmbH & Co. KG). Separately, 2.74 g of isocyanatomethyldimethylmethoxysilane are weighed out. The components are not mixed until just before the start of the first IR measurement which monitors the disappearance of the NCO band at 2150 cm$^{-1}$. The tightly sealed sample bottle is heated in a waterbath at 50° C. Every 30 minutes, an IR measurement is carried out. After 2.0 hours, the NCO band can no longer be seen. 6.74 g of polypropylene glycol having dimethylmethoxysilylmethyl end groups and a viscosity of 90 mPa·s are obtained. The $^{13}$C NMR spectra show the absence of undesired by-products, for example isocyanurates.

COMPARATIVE EXAMPLE 1

4 g of polypropylene glycol having an average molar mass $M_n$=425 (commercially available from Sigma-Aldrich Chemie GmbH; 18.8 mmol of terminal OH groups) are mixed efficiently with a mixture of 4 mg of dibutyltin dilaurate. Separately, 2.74 g of isocyanatomethyldimethyl-methoxysilane are weighed out. The components are not mixed until just before the start of the first IR measurement which monitors the disappearance of the NCO band at 2150 cm$^{-1}$. The tightly sealed sample bottle is heated in a waterbath at 50° C. Every 30 minutes, an IR measurement is carried out. After 2.0 hours, the NCO band can no longer be seen. 6.74 g of polypropylene glycol having dimethylmethoxysilylmethyl end groups and a viscosity of 90 mPa·s are obtained.

EXAMPLE 2

1000 g of polypropylene glycol having an OH number of 10 mg KOH/g (commercially available from Bayer AG, Germany), under the name "Acclaim 12200") are mixed with 38.4 g of isocyanatomethyltrimethoxysilane (commercially available under the brand GENIOSIL® XL 43 from Wacker-Chemie GmbH, Germany) and a mixture of 0.08 g of bismuth neodecanoate (commercially available from ABCR GmbH & Co. KG) and 0.02 g of zinc 2-ethylhexanoate (commercially available from ABCR GmbH & Co. KG) and reacted at 80° C. within one hour. The reaction is monitored by means of IR (NCO band at 2150 cm$^{-1}$). 1038 g of polypropylene glycol having trimethoxysilylmethyl end groups are obtained. A sample was transferred to round aluminum dishes (diameter 5 cm, fill height approx. 0.5 cm) and stored at 23° C. and 50% rel. atmospheric humidity, and the viscosity was subsequently determined. The results can be found in Table 1.

COMPARATIVE EXAMPLE C2

The procedure described in Example 2 is repeated with the modification that, instead of 0.1 g of the catalyst mixture used in Example 2, 0.1 g of dibutyltin dilaurate was used. 1038 g of polypropylene glycol having trimethoxysilylm-ethyl end groups are obtained. A sample was transferred to round aluminum dishes (diameter 5 cm, fill height approx. 0.5 cm) and stored at 23° C. and 50% rel. atmospheric humidity, and the viscosity was subsequently determined. The results can be found in Table 1. It can be clearly seen that the viscosity increases undesirably and the polymer finally gels and thus becomes unusable.

EXAMPLE 3

1000 g of polypropylene glycol having an OH number of 10 mg KOH/g (commercially available from Bayer AG, Germany), under the name "Acclaim 12200") are mixed with 34.2 g of isocyanatomethyldimethoxymethylsilane (commercially available under the brand GENIOSIL® XL 42 from Wacker-Chemie GmbH, Germany) and 0.1 g of a mixture of 0.08 g of bismuth neodecanoate (commercially available from ABCR GmbH & Co. KG) and 0.02 g of zinc 2-ethylhexanoate (commercially available from ABCR GmbH & Co. KG) and reacted at 80° C. within one hour. The reaction is monitored by means of IR (NCO band at 2150 cm$^{-1}$). 1034 g of polypropylene glycol having methyldimethoxysilylmethyl end groups are obtained. A sample was transferred to round aluminum dishes (diameter 5 cm, fill height approx. 0.5 cm) and stored at 23° C. and 50% rel. atmospheric humidity, and the viscosity was subsequently determined. The results can be found in Table 1.

COMPARATIVE EXAMPLE C3

The procedure described in Example 3 is repeated with the modification that, instead of 0.1 g of the catalyst mixture used in Example 3, 0.1 g of dibutyltin dilaurate was used. 1034 g of polypropylene glycol having methyldimethoxysilylmethyl end groups are obtained. A sample was transferred to round aluminum dishes (diameter 5 cm, fill height approx. 0.5 cm) and stored at 23° C. and 50% rel. atmospheric humidity, and the viscosity was subsequently determined. The results can be found in Table 1. It can be clearly seen that the viscosity increases undesirably and the polymer finally gels and thus becomes unusable.

EXAMPLE 4

1000 g of polypropylene glycol having an OH number of 10 mg KOH/g (commercially available from Bayer AG, Germany), under the name "Acclaim 12200") are mixed with 40.2 g of isocyanatopropyltrimethoxysilane (commercially available under the brand GENIOSIL® GF 40 from Wacker-Chemie GmbH, Germany) and 0.1 g of zinc acetylacetonate and reacted at 80° C. within one hour. The reaction is monitored by means of IR (NCO band at 2150 cm$^{-1}$). 1040 g of polypropylene glycol having trimethoxysilylpropyl end groups are obtained. A sample was transferred to round aluminum dishes (diameter 5 cm, fill height approx. 0.5 cm) and stored at 23° C. and 50% rel. atmospheric humidity, and the viscosity was subsequently determined. The results can be found in Table 1.

COMPARATIVE EXAMPLE C4

The procedure described in Example 4 is repeated with the modification that, instead of 0.1 g of zinc acetylacetonate, 0.1 g of dibutyltin dilaurate was used. 1040 g of polypropylene glycol having trimethoxysilylpropyl end groups are obtained. A sample was transferred to round aluminum dishes (diameter 5 cm, fill height approx. 0.5 cm)

and stored at 23° C. and 50% rel. atmospheric humidity, and the viscosity was subsequently determined. The results can be found in Table 1. It can be clearly seen that the viscosity increases undesirably and the polymer finally gels and thus becomes unusable.

TABLE 1

Viscosity After Preparation And Storage Of The Polymers Under Air (23° C./50% rh)

| Viscosity (mPas) after storage | Examples | | | Comparative examples | | |
|---|---|---|---|---|---|---|
| | 2 | 3 | 4 | C2 | C3 | C4 |
| 0 days | 20900 | 10600 | 12500 | 23400 | 9900 | 12000 |
| 1 day | 22000 | 10400 | 12700 | gels | gels | gels |
| 2 days | 22700 | 11400 | 13000 | — | — | — |
| 5 days | 24400 | 12100 | 12900 | — | — | — |

EXAMPLE 5

29.5 g of the polymer prepared according to Example 2 are mixed with 5 g of diisooctyl phthalate and 0.5 g of methyl trimethoxysilylmethylcarbamate (commercially available under the name GENIOSIL® XL 63 from Wacker-Chemie GmbH, Germany) and, in a fast-running stirrer (SpeedMixer DAC 150 FV from Hauschild, Germany), 4.5 g of hydrophobic silica having a BET surface area of 140 m²/g (commercially available under the brand Wacker HDK® H 2000 from Wacker-Chemie GmbH, Germany) and 29.5 g of chalk having a BET surface area of 4 m²/g (commercially available under the name "Omya BLR 3" from Omya GmbH) are mixed in. Subsequently, 0.5 g of aminopropyltrimethoxysilane (commercially available under the brand GENIOSIL® GF 96 from Wacker-Chemie GmbH, Germany) as an adhesion promoter and simultaneously as a catalyst is added with exclusion of atmospheric moisture. A mass of firm consistency was obtained.

The thus obtained mass is now applied using a doctor blade to polyethylene film in a thickness of 2 mm and allowed to crosslink at 23° C. and 50% rel. atmospheric humidity. The skin formation time is 2 minutes.

EXAMPLE 6

The procedure described in Example 5 is repeated with the modification that, instead of the polymer prepared in Example 2, the same amount of polymer prepared in Example 3 is used. The skin formation time is 15 minutes.

EXAMPLE 7

29.5 g of the polymer prepared according to Example 4 are mixed with 5 g of diisooctyl phthalate and 0.5 g of methyl trimethoxysilylmethylcarbamate (commercially available under the name GENIOSIL® XL 63 from Wacker-Chemie GmbH, Germany) and, in a fast-running stirrer (SpeedMixer DAC 150 FV from Hauschild, Germany), 4.5 g of hydrophobic silica having a BET surface area of 140 m²/g (commercially available under the brand Wacker HDK® H 2000 from Wacker-Chemie GmbH, Germany) and 29.5 g of chalk having a BET surface area of 4 m²/g (commercially available under the name "Omya BLR 3" from Omya GmbH) are mixed in. Subsequently, 0.5 g of aminopropyltrimethoxysilane (commercially available under the brand GENIOSIL® GF 96 from Wacker-Chemie GmbH, Germany) as an adhesion promoter and simultaneously as a catalyst is added with exclusion of atmospheric moisture. A mass of firm consistency was obtained.

The thus obtained mass is now applied using a doctor blade to polyethylene film in a thickness of 2 mm and allowed to crosslink at 23° C. and 50% rel. atmospheric humidity. The skin formation time is 20 minutes.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A process for preparing storage stable organyloxysilyl-terminated polymers (A) having a plurality of terminal groups of the formula $$R^2_{3-n}(OR^1)_n Si-R-NH-C(O)-O-,$$

comprising reacting an organic polymer having at least six carbon atoms which may be interrupted with heteroatoms, and which contains a plurality of hydroxyl groups, with one or more isocyanate-functional silanes of the formula $$R^2_{3-n}(OR^1)_n Si-R-NCO \quad (III)$$

in the presence of at least one urethane reaction promoting catalyst selected from the group consisting of bismuth and zinc compounds,
wherein
R are each divalent, optionally substituted hydrocarbon radicals having from 1 to 12 carbon atoms which may be interrupted by heteroatoms,
$R^1$ are the same or different and are each a monovalent, optionally substituted hydrocarbon radical having from 1 to 12 carbon atoms which may be interrupted by heteroatoms,
$R^2$ are the same or different and are each a monovalent, optionally substituted hydrocarbon radical having from 1 to 12 carbon atoms which may be interrupted by heteroatoms, and
n is 1, 2 or 3,
and packaging said polymers as a one-component moisture-curable composition, wherein the polymers (A) are stable with respect to moisture curing in the absence of a moisture cure catalyst other than the bismuth or zinc compounds used to prepare the polymer
wherein said organyloxysilyl-terminated polymer (A) is one of the formula $$R^2_{3-n}(OR^1)_n Si-R-NH-C(O)-O-A-O-C(O)-NH-R-Si(OR^1)_n R^2_{3-n} \quad (I)$$

prepared by reacting one or more α,ω-dihydroxy-terminated polymers of the formula $$OH-A-OH \quad (II)$$

with said isocyanato-functional silane(s), where A is a divalent, optionally substituted hydrocarbon radical having at least six carbon atoms, optionally interrupted by one or more O, N, or S heteroatoms with the proviso that radical A does not contain a polyurethane.

2. The process of claim 1, wherein the organic polymers of the formula (II) are polymers containing polyether moieties.

3. The process of claim 2, wherein n in formula (III) is 2 or 3.

4. The process of claim 2, wherein the catalyst is a carboxylate.

5. The process of claim 1, wherein n in formula (III) is 2 or 3.

6. The process of claim 5, wherein the catalyst is a carboxylate.

7. The process of claim 1, wherein the catalyst is a carboxylate.

8. A process for preparing crosslinkable compositions, which comprises, in a first step, preparing at least one organyloxysilyl-terminated polymer (A) of claim 1, and in a second step, mixing the polymers (A) obtained in the first step with at least one silane condensation catalyst (B).

9. The process of claim 8, wherein silane condensation catalyst (B) is used in amounts of from 0.01 to 3.0 parts by weight, based on 100 parts by weight of polymer (A).

10. The process of claim 8, wherein the crosslinkable composition further comprises one or more fillers, additives, crosslinkers, or plasticizers.

11. The process of claim 8, wherein the second step is carried out at a temperature of from 10 to 100° C. and at the pressure of the surrounding atmosphere.

12. The process of claim 8, wherein the amount of said silane condensation catalyst is from 0.1 to 1.0 weight percent based on the weight of polymer (A).

13. The process of claim 8, wherein the silane condensation catalyst is one or more selected from the group consisting of dibutyltin dilaurate, dibutyltin diacetate, tetrabutyldimethoxydistannoxane, solutions of dibutyltin oxide in methyltrimethoxysilane, solutions of dibutyltin oxide in tetraethoxysilane, dioctyltin dilaurate, dioctyltin diacetate, tetraoctyldimethoxydistannoxane, solutions of dioctyltin oxide in methyltrimethoxysilane, solutions of dioctyltin oxide in tetraethoxysilane, dibutyltin bis(2,4-pentanedionate), dibutyltin maleate, aminopropyltrimethoxysilane and aminoethylaminopropyltrimethoxysilane, organic carboxylic acids, phosphoric acids, phosphoric esters, acid chlorides, and hydrochlorides.

14. The process of claim 8, wherein said silane condensation catalyst is a mono- or dialkylphosphate, an aminoalkylsilane, or mixture thereof.

15. The process of claim 1, wherein said organic polymer comprises a polyoxypropylene glycol.

16. The process of claim 1, wherein at least one catalyst is selected from the group consisting of bismuth neodecanoate, zinc 2-ethylhexanoate, zinc acetylacetonate, and mixtures thereof.

17. The process of claim 1, wherein A is a divalent radical derived from one or more polymers selected from the group consisting of polyoxyalkylene polyethers, polyesters, polycarbonates, polyestercarbonates, polybutylene, and polybutadiene.

* * * * *